United States Patent
Hoffman et al.

(10) Patent No.: US 11,873,450 B2
(45) Date of Patent: Jan. 16, 2024

(54) SYSTEMS AND METHODS FOR THE THERMOCHEMICAL PRODUCTION AND REFINING OF HYDROCARBON COMPOUNDS

(71) Applicant: Teal Sales Incorporated, Lynnwood, WA (US)

(72) Inventors: Matthew Bernard Mclauglin Hoffman, Mountlake Terrace, WA (US); William B. Teal, Woodway, WA (US)

(73) Assignee: Teal Sales Incorporated, Lynnwood, WA (US)

( * ) Notice: Subject to any disclaimer, the term of this patent is extended or adjusted under 35 U.S.C. 154(b) by 0 days.

(21) Appl. No.: 18/109,624

(22) Filed: Feb. 14, 2023

(65) Prior Publication Data
US 2023/0257658 A1    Aug. 17, 2023

Related U.S. Application Data

(60) Provisional application No. 63/311,220, filed on Feb. 17, 2022.

(51) Int. Cl.
| | | |
|---|---|---|
| *C10G 1/00* | (2006.01) | |
| *C10G 1/02* | (2006.01) | |
| *C10G 9/04* | (2006.01) | |
| *C10G 9/38* | (2006.01) | |
| *B01J 19/24* | (2006.01) | |
| *B01J 19/00* | (2006.01) | |

(52) U.S. Cl.
CPC .......... *C10G 1/002* (2013.01); *B01J 19/0013* (2013.01); *B01J 19/2465* (2013.01); *C10G 1/02* (2013.01); *C10G 9/04* (2013.01); *C10G 9/38* (2013.01); *C10G 2300/1014* (2013.01); *C10G 2300/4006* (2013.01); *C10G 2300/4018* (2013.01); *C10G 2300/4081* (2013.01)

(58) Field of Classification Search
CPC ......... B01J 8/0015; B01J 8/0285; C10L 9/083
See application file for complete search history.

(56) References Cited

U.S. PATENT DOCUMENTS

| | | | |
|---|---|---|---|
| 2009/0007484 A1* | 1/2009 | Smith | C10B 53/02 422/187 |
| 2010/0242351 A1 | 9/2010 | Causer | |
| 2012/0017492 A1* | 1/2012 | Ramirez Corredores | C10L 1/02 44/307 |
| 2015/0299579 A1* | 10/2015 | Van Thorre | C10L 1/04 585/16 |

FOREIGN PATENT DOCUMENTS

| | | | | |
|---|---|---|---|---|
| WO | 2007000607 A1 | 1/2007 | | |
| WO | 2011057822 A1 | 5/2011 | | |
| WO | 2012048146 A1 | 4/2012 | | |
| WO | WO-2012048146 A1 * | 4/2012 | ............. | C10B 1/10 |
| WO | 2014075013 A1 | 5/2014 | | |

OTHER PUBLICATIONS

International Search Report and Written Opinion for PCT/US2023/062575, dated May 30, 2023, 8 pages.

\* cited by examiner

*Primary Examiner* — Randy Boyer
(74) *Attorney, Agent, or Firm* — Cozen O'Connor

(57) ABSTRACT

A system is provided that enables a continuous process that involves the introduction of particles into a reactor drum having a low oxygen environment. Heavy hydrocarbons are boiled off of the particles during the heating of the particles. The boiled off heavy hydrocarbons mix with a heated gas stream that heats the particles within the reactor drum. The heated gas stream (with the boiled off heavy hydrocarbons) exit the drum and are recirculated back to a heat source for reheating the gas stream prior to reentering the reactor drum. Repeated exposure to the elevated temperatures within the reactor drum cracks the heavy hydrocarbons into lighter hydrocarbons. The lighter hydrocarbons may then be separated out of the heated gas stream and collected for sale or use.

10 Claims, 8 Drawing Sheets

SYSTEMS AND METHODS FOR THE THERMOCHEMICAL PRODUCTION AND REFINING OF HYDROCARBON COMPOUNDS

CROSS-REFERENCE TO RELATED APPLICATION

This patent application claims priority of U.S. Patent Application No. 63/311,220, filed on Feb. 17, 2022, the entire disclosure of which is hereby incorporated by reference herein for all purposes.

BACKGROUND

Technical Field

This disclosure generally relates to pyrolysis, torrefaction, and or gasification systems and methods, and more specifically to the production of gaseous and liquid hydrocarbon products via biomass pyrolysis, torrefaction, and gasification systems and methods.

Description of the Related Art

Torrefaction/pyrolysis/gasification of biomass particles is well known and is a process in which biomass and/or other organic particles are heated in a low oxygen environment. This causes volatile compounds within the particles to be boiled off and the cellular structure of the particles to be degraded, resulting in a partial loss of mass and an increase in friability. Torrefaction/pyrolysis/gasification also causes a reaction within the remaining cellular structure that enhances the moisture resistance of the resulting product. The particles that remain after undergoing a torrefaction/pyrolysis/gasification process have an enhanced energy value when measured in terms of heat energy per unit of weight. The degree of torrefaction/pyrolysis/gasification of biomass and/or other organic particles depends on several factors, including composition, the level of heat applied, the length of time the heat is applied, and surrounding gas conditions (particularly with respect to oxygen level).

Current torrefaction/pyrolysis/gasification systems remove/release volatiles (sometimes referred to as tars) in a gaseous phase from the raw particles that were input into the system as part of the process to produce torrefied particles. These volatiles are typically treated as a waste/byproduct that needs to be disposed of as part of the torrefaction/pyrolysis/gasification process. The production, capture, and disposal of these tars decrease the efficiency of a torrefaction/pyrolysis/gasification system.

BRIEF SUMMARY

Embodiments described herein provide systems and methods which are particularly well adapted for torrefying organic particles (including in particular cellulosic biomass particles) of various sizes in an efficient and consistent manner while also refining the removed volatiles into a byproduct that may be collected instead of or in addition to the torrefied organic particles. The systems and methods are readily scalable to meet a wide variety of industry needs and provide enhanced process control with respect to monitoring and adjusting operational parameters to optimize or tailor characteristics of the resultant torrefaction/pyrolysis/gasification biomass particles, the refined volatiles, or both.

Torrefaction, gasification, and pyrolysis (TGP) reactions are similar in nature, primarily differentiated by the range of temperatures at which the reaction is performed. For the purposes of this disclosure, TGP reactions broadly include the thermochemical decomposition of organic compounds in a manner where oxidizing agents are controlled or entirely eliminated. For the purposes of this disclosure, use of the terms "torrefaction," "pyrolysis," and "gasification" are understood to be interchangeable unless specifically noted otherwise.

Thermochemical bio-oils include a range of hydrocarbon products produced from thermochemical processing of biologically generated organic materials. The thermochemical processing produces hydrocarbon compounds typically derived from fossil fuels. Examples include crude oil, jet fuel, gasoline, alcohols, diesel, solvents, polymers, alkanes, alkenes, alkadienes, aromatics, carboxylic acids, and many other organic compounds.

Thermal cracking, is a process that capitalizes on heat and or pressure to break larger, heavier hydrocarbon molecules into smaller, lighter molecules. Thermal cracking as used herein refers to the decomposition of hydrocarbon compounds. Thermal cracking may result from TGP reactions (e.g., within a system disclosed herein). Catalytic cracking is another process that refines hydrocarbon molecules. Catalytic cracking uses a catalyst to promote breaking of larger, heavier hydrocarbon molecules into smaller, lighter molecules. The catalyst may enable modification of reaction temperatures, pressures, ratios and kinds of compounds generated, or any combination thereof.

According to one embodiment, a TGP system may be summarized as including an inlet to receive particles (e.g., biomass particles), a reactor drum rotatable about its longitudinal axis, a heat source upstream of the reactor drum to heat gas contained in the system to a temperature sufficient to initiate and sustain a TGP reaction of the particles within the reactor drum during operation of the system, a fan device that creates, when the system is in operation, a flow of heated gas through the reactor drum sufficient to sustain TGP reaction of the particles within the reactor drum along the length of the reactor drum as the particles interact with the heated gas stream as the reactor drum rotates, and gas ducts coupled to at least the reactor drum, heat source, and fan device to recirculate a portion of gas or gasses exiting the reactor drum back to the heat source to reheat the gas for reintroduction into the reactor drum.

The heated gas stream directly heats the particles as the gas stream circulates through the reactor drum. As the particles are heated, compounds in the particles may be thermochemically decomposed via TGP reactions (e.g., into compounds including elements, organic, hydrocarbon compounds/mixtures, or any combination thereof that may be in the form of one or more of a gas, vapor, and aerosol) within the reactor. These gas mixtures are commonly referred to as synthesis gas or syngas. The heating of the particles may produce a quantity of syngas that exceeds what is needed to circulate through the system and maintain the TGP reactions within the reactor drum.

The reactor drum may be configured to regulate movement of the particles through the reactor drum, thereby influencing the retention time of the particles within the reactor drum. The reactor drum may include features that interoperate with the heated syngas stream to classify the particles according to particle density, particle size, or both, (e.g., by moving relatively denser particles more slowly through the reactor drum compared to similarly sized particles, by moving relatively larger particles through the reactor drum more slowly compared to particles having similar densities, etc.).

The TGP system may further include a hopper located downstream of the reactor drum to collect solid particles exiting the reactor drum and to discharge the solid particles from the system. The system may further include ducting to remove gas from and/or introduce gas to the system at various locations. The ducting may include control valves and dampers positioned to regulate a pressure level within the system to inhibit the infiltration of oxygen while enabling gas phase elements and/or compounds to enter and/or exit the system.

The ducting may route gas from the system to a remote device or devices for use of the exhaust gas in an auxiliary or supplemental process. The remote device or devices may include, for example, systems and methods for isolation, separation, collection, or any combination thereof of components from the routed gas. Examples of the remote devices may include condensers, separators, quenchers, scrubbers, compressors, expanders, or any combination thereof. The remote devices may include a heat source, such as a combustion system, that utilizes a portion of the routed gas (either as a whole, or select components thereof) to generate heat, which may then be supplied (e.g., via a heat exchanger) to the gas stream on its way to the reactor drum.

The system may further include at least one airlock located between the inlet and the reactor drum to limit the amount of oxygen entering the system when receiving the particles. The system may further include at least one seal mechanism between the reactor drum and adjacent structures. The seal mechanism may maintain separation of the contents of the reactor drum and the surrounding atmosphere. The TGP system may include a mechanism coupled to an inert or semi-inert gas or steam source for selective purging of the reactor drum (e.g., during a startup or shutdown operation) to maintain an oxygen free environment within the reactor drum.

In accordance with one embodiment, the system may be calibrated such that gases, vapors and or compounds generated from TGP reactions (e.g., hydrocarbons) are contained in the system at an elevated temperature (e.g., between about 220° F. and about 1,250° F.) for a time period in excess of the solid particles, for example from about 110% to about 1000% of the time it takes for a solid particle to transit the length of the reactor drum.

The system may be assembled such that the circulating gas mixture makes a plurality of passes through a gas circulation loop. The loop may include areas of elevated temperature within the system. The areas of elevated temperature may include the reactor drum, areas that include or are proximate to heating element(s), areas that include or are proximate to combustion elements, areas that include or are proximate to heated bed material, areas that include or are proximate to heat exchanger(s), or any combination thereof to facilitate refinement of the gas mixture (e.g., thermal cracking of heavy hydrocarbons). The areas of elevated temperature may serve as the primary methods of increasing the temperature of the gas within the loop. The system may include, for example, an electric heater, a heated bed of material, a heat exchanger, direct combustion of a substance within the loop, or any combination thereof. The system may also be assembled such that zones of elevated temperature are isolated/independent of the heating of the particles within the reactor drum. For example, the system may include a flash/reflux drum, a high temperature pyrolyzer, a packed column, or any combination thereof.

In accordance with one embodiment, the system may include temperature differences along the loop that separate specific components (e.g., hydrocarbon compounds) from a remainder of the circulating gas mixture. The separation may occur via phase change behavior (e.g., distillation and condensation of individual hydrocarbon compound(s)). The localized separation of hydrocarbon compound(s) enables selective removal of these compounds from the system. The system may contain components that remove the compounds from the loop permanently, and direct the compounds for further processing or use within other processes of the system. The system may also include components that reintroduce the compounds to the loop after further processing or at a different location in the system.

In accordance with one embodiment, a stream of specific hydrocarbon compound(s), isomer(s), element(s), mixtures, or any combination thereof may be selectively removed from the circulation loop, (e.g., for the purpose of generating a chemical equilibrium imbalance within the process). The chemical equilibrium imbalance may be designed to increase production of specific hydrocarbon compound(s), isomer(s), element(s), mixtures, or any combination thereof by the system. According to one embodiment, the system may include components that affect the TGP reaction thereby favoring the production of the specific element(s), hydrocarbon compound(s), isomers, and or precursor compound(s)/radical(s) that restore equilibrium.

According to one embodiment, the system may include components and systems that perform thermal cracking or decomposition of heavier hydrocarbons in the system (e.g., in places other than the reactor drum), which promotes production of the specific hydrocarbon compound(s), element(s) and or precursor compound(s)/radical(s) that restore equilibrium. The system may thermally decompose gases within the system into compounds and elements that restore equilibrium (e.g., directly or through side reactions).

The system may be assembled to perform repeated cracking, isomerization, reforming, or any combination thereof, of compounds, mixtures, molecules, or any combination thereof contained within the loop. The system may, in operation, preserve isomers, molecules, compounds, or any combination thereof which are thermally stable under the conditions contained within the system. The preservation of thermally stable molecules may enable targeting of unstable/less-stable molecules, isomers, compounds, or any combination thereof for breakdown within the system. The system may include components that maintain conditions favoring production of target isomers, molecules, compounds, substances, or any combination thereof within the system.

According to one embodiment, a torrefaction, gasification, and/or pyrolysis system includes a reactor drum, a heat source that heats gas contained within the system to a temperature sufficient to torrefy particles within the reactor drum, a device that moves the heated gas thereby forming a heated gas stream that passes through the reactor drum, a duct system communicatively coupled to the heat source and the reactor drum thereby forming a recirculation loop that allows the heated gas to make multiple passes through the reactor drum, and a region that separates a first hydrocarbon compound contained within the heated gas stream from a remainder of the heated gas stream, the remainder of the heated gas stream including a second hydrocarbon compound that is heavier than the first hydrocarbon compound.

According to one embodiment, a method of torrefying particles includes producing a heated gas stream, moving particles into an interior space of a reactor drum, directing the heated gas stream to pass through a first end of the reactor drum and to enter the interior space of the reactor drum, heating the particles within the interior space of the reactor drum, thereby releasing a hydrocarbon compound from the particles in a gaseous phase and mixing the released hydrocarbon compounds with the heated gas stream, directing the released hydrocarbon compounds, via the heated gas stream, through a second end of the reactor drum thereby exiting the interior space of the reactor drum.

The method further includes, after exiting the interior space, directing the released hydrocarbon compounds along a route to the first end of the reactor drum, directing the released hydrocarbon compounds through the first end of the reactor drum and through the interior space of the reactor drum, while the released hydrocarbon compounds are in the interior space, cracking the released hydrocarbon compounds thereby forming at least one lighter hydrocarbon compound, and separating the at least one lighter hydrocarbon compound from a remainder of the heated gas stream.

DETAILED DESCRIPTION

In the following description, certain specific details are set forth in order to provide a thorough understanding of various disclosed embodiments. However, one skilled in the relevant art will recognize that embodiments may be practiced without one or more of these specific details. In other instances, well-known structures or steps associated with industrial process equipment and industrial processes may not be shown or described in detail to avoid unnecessarily obscuring descriptions of the embodiments.

For instance, it will be appreciated by those of ordinary skill in the relevant art that various sensors (e.g., temperature sensors, oxygen sensors, etc.), control devices and other industrial process controls may be provided and managed via a programmable logic controller (PLC) or other suitable control system for monitoring the systems described herein and controlling operational parameters of the processes to optimize or tailor characteristics of the resultant torrefied particles.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics described herein may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

Recitation of ranges of values herein are merely intended to serve as a shorthand method of referring individually to each separate value falling within the range including the stated ends of the range, unless otherwise indicated herein, and each separate value is incorporated into the specification as if it were individually recited herein.

The headings and Abstract of the Disclosure provided herein are for convenience only and do not interpret the scope or meaning of the embodiments.

Figure 1:
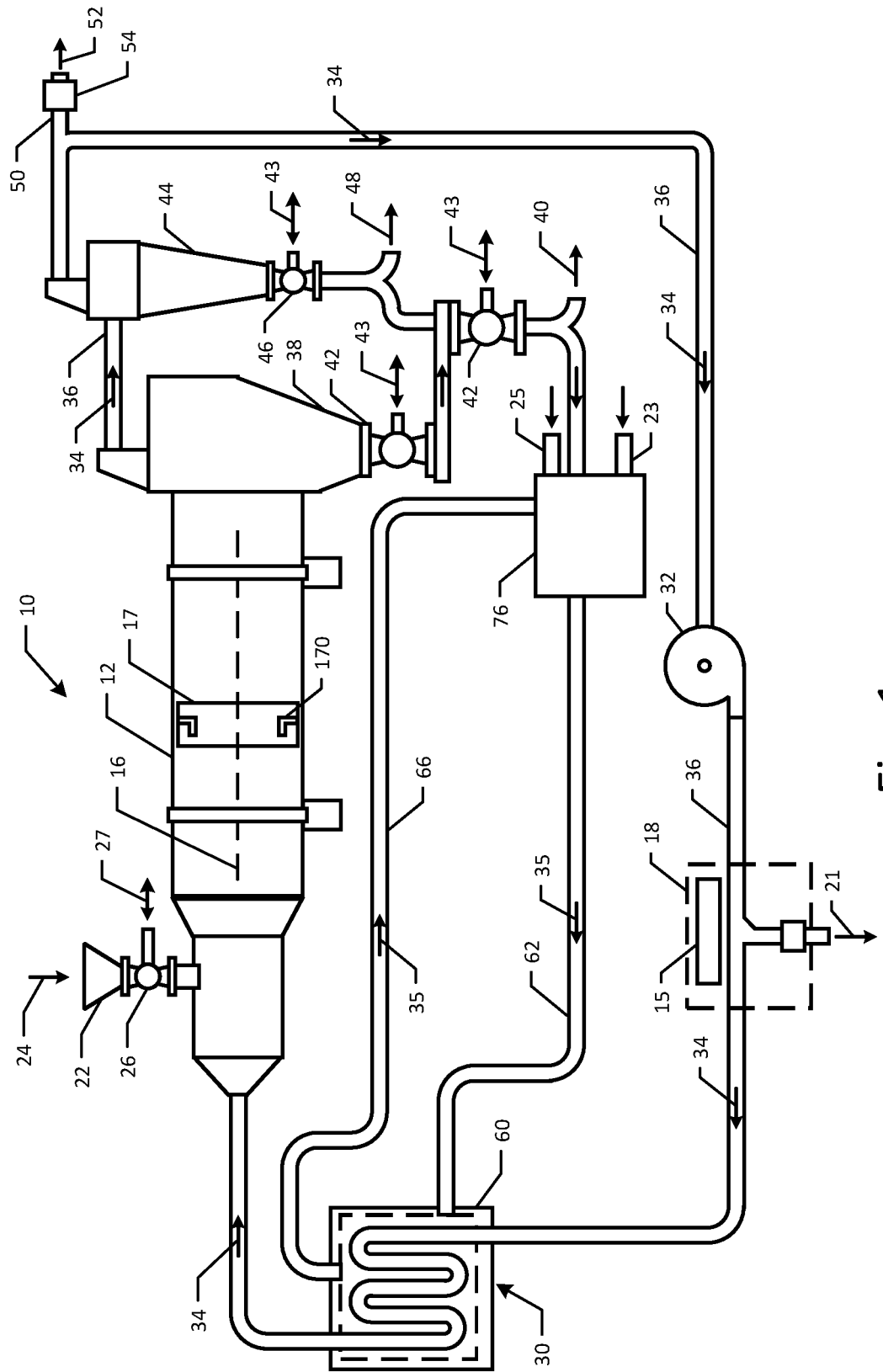
FIG. 1 is a schematic diagram of a system according to one embodiment.

FIG. 1 shows a schematic of a system 10 (e.g., a torrefaction, gasification, and/or pyrolysis system) according to one example embodiment. The system 10 includes a reaction chamber or vessel (referred to herein as a reactor drum 12) supported so as to rotate about a longitudinal axis 16 of the reactor drum 12. The reactor drum 12 includes an inner volume that may be cylindrical, as shown, or another tubular shape (e.g., rectangular, square, irregular, etc.) that corresponds to a shape of an outer wall of the reactor drum 12. The shape of the inner volume may be constant along some or all of the length of the reactor drum 12, or the shape may change (e.g., taper) along the length of the reactor drum 12. The system 10 may further include an inlet 22 that receives particles (e.g., biomass particles) that are to be processed, as represented by the arrow labeled 24. An airlock or dual airlock 26 with optional inert or semi-inert gas purging 27 or similar device may be coupled to the inlet 22 to substantially prevent oxygen from entering the system 10 when particles are fed into the system 10. The particles may be fed to the inlet 22 via a conveyor or other conventional material transport mechanism. In one embodiment, a plug-feed screw conveyor may be used in lieu of the airlock(s) to create a plug of material that acts as a seal when passing particles through the inlet 22.

The system 10 may further include a heat source 30 disposed upstream of the reactor drum 12. The heat source may supply heat to a gas stream 34 generated within the system 10 (e.g., by a fan device 32). According to one embodiment, the fan device 32 may be, for example, an induced draft fan device or a forced draft fan device. The fan device 32 may be operable to draw or force gas through the reactor drum 12 and circulate the gas (or a substantial portion of the gas) back to the heat source 30 to be reheated and supplied to the reactor drum 12 in a recirculating manner. In some embodiments, eighty percent or more of the gas by volume exiting the reactor drum 12 may be recirculated to the inlet of the reactor drum 12. In some embodiments, ninety percent or more of the gas by volume exiting the reactor drum 12 is recirculated to the inlet of the reactor drum 12. In some embodiments, ninety-five percent or more of the gas by volume exiting the reactor drum 12 is recirculated to the inlet of the reactor drum 12.

During operation, the gas stream 34 may act as a thermal fluid to carry heat energy to the particles within the reactor drum 12. According to one embodiment, the gas stream 34 may also provide momentum for conveyance of the particles. The gas stream 34 may also heat the internal structure of the reactor drum 12, (e.g., a number of lifting flights 170 or other structure within the reactor drum 12 that directly contacts the particles), which may also in turn heat the particles. Two of the number of lifting flights 170 are visible via a cutout 17 provided in the illustration of the reactor drum 12 to provide visibility of a portion of the internal structure of the reactor drum 12 including the lifting flights 170.

The system 10 may include gas ducts 36, appropriately sized and coupled to at least the reactor drum 12, heat source 30 and fan device 32 to recirculate the gas stream 34 in the system 10. According to one embodiment, a portion up to an entire amount of gas entering the reactor drum 12 is recirculated back to the inlet of the reactor drum 12 in a continuous manner. In some embodiments, no new gas (other than unintended leakage) is supplied to the recirculating gas stream 34 during operation.

According to one embodiment, the system 10 may include a plurality of stages with different temperatures, retention times, chemistry and/or operational conditions. The plurality of stages may be mechanically isolated from one another. The system 10 may, for example, contain multiple drums with airlocks and hoppers. The system 10 may also include drums that provide isolation between sections using solids, for example progressive screw features, conical geometry, circulating/fluidized solids trap, and or porting. The system 10 may use solids that are involved in the TGP process, or independent of the TGP process for example ceramic media and or sand. The system 10 may include features, cavities, ducting and/or other components that add and/or remove elements and/or compounds from the gas stream 34 between mechanically isolated sections.

Torrefaction, gasification, and/or pyrolysis of the particles within reactor drum 12 may release compounds (e.g., hydrocarbons in a gaseous phase) that enter and mix with the gas stream 34. The system 10 may include components that vent or exhaust an amount of gas from the gas stream 34 so as to maintain a relatively steady pressure within the system 10. According to one embodiment, the system 10 may include components 15 that enable extraction of specific (e.g., targeted) compounds from the gas stream 34. The components 15 may include a heater, a cooler, a pressurizer, a separator, or any combination thereof. The components 15 may be applied to the full gas stream 34 or any fractional portion of the gas stream 34.

The region 18 may include a media and/or systems of media to supplement separation of compounds from the gas stream 34. The system 10 may contain media in a separate vessel, (e.g., a structured media column). The structured media column may operate dry, providing large surface area for condensation and/or evaporation. The column may, for example, operate with a fluid or fluidized solid, utilizing adsorption/desorption of elements and compounds in the gas stream 34. The system 10 may also contain media directly within the system (e.g., a ceramic media bed introduced with the material at the inlet). The system may also contain media which is regenerable via another process, and operates in a batch mode. The system 10 may also contain, for example, media that is continuously regenerated or consumed as part of a cycle and/or another process. The system 10 may also contain media which operates via established methods such as, for example, an electrostatic precipitator.

The system 10 may include a region 18 within which the components that enable extraction of the specific compounds are removed from the gas stream 34. According to one embodiment, the region 18 may include both a temperature range and pressure range that encourage liquid drop-out of a target compound. The target compound may include a category of specific compounds (e.g., alkanes, alkenes, etc.) or the target compound may include a specific compound (e.g., methane, butane, etc.). For example, the gas stream 34 may include both light hydrocarbons and heavy hydrocarbons. As used herein "light hydrocarbons" refers to lower molecular weight hydrocarbons (e.g., hydrocarbons containing between 1 and 11 carbon atoms), with examples including octane, propane, propanol, cyclohexane, and pentane. As used herein "heavy hydrocarbons" refers to hydrocarbon compounds with higher molecular weight (e.g., hydrocarbons containing 12 or more carbon atoms), with examples including dodecane, pentadecane, eicosane, and polymerized light hydrocarbon molecules/chains.

The region 18 may include a temperature and pressure that are below the dew point of the target compound (e.g., the heavy hydrocarbons) such that as the heavy hydrocarbons pass through the region 18, the heavy hydrocarbons transition from their current gas phase to a liquid phase while the light hydrocarbons remain in the gas phase. The liquid form of the heavy hydrocarbons may then be extracted from the system 10, as indicated by arrow 21, while the light hydrocarbons pass through the region 18 and remain within the circulation loop.

The region 18 may include features that allow the removal of the gaseous light hydrocarbons from the system 10, (e.g., once the heavy hydrocarbons have been removed as described above). The region 18 may also include features that allow the condensed heavy hydrocarbons that have been removed from the gas stream 34 to be returned to a gaseous state, and then reintroduced to a gas stream wherein the light hydrocarbons have been removed as described above.

According to one embodiment, the temperature of the region 18 may be between about 0° F. and about 1,200° F. with a pressure between about 0.01 psia and about 2,500 psia. As the gas stream 34 passes through the region 18, heavier hydrocarbons (e.g., dodecane) may transition from a gas phase to a liquid phase and drop out of the gas stream 34. The liquid may then be removed from the system 10 and collected or returned to a gaseous state and reintroduced to the system 10.

The system 10 may be calibrated to increase production of the target compound. According to one embodiment, the torrefaction, gasification, and/or pyrolysis of particles (e.g., biomass particles) within the reactor drum 12 releases hydrocarbons from the particles. These hydrocarbons may be "boiled off" of the particles such that they are released in a gaseous phase. Upon release from the particles, the released hydrocarbons are typically of the heavier varieties. The gaseous byproduct boiled off of the particles in previous torrefaction systems/processes is typically treated as waste or an excess material to be disposed of. In some cases the gaseous byproduct may be routed to a burner to extract some benefit as a low-quality fuel to help heat the system 10 and minimize losses.

However, according to one embodiment, the gaseous byproduct may be refined within the system 10 into more valuable compounds (e.g., "lighter" hydrocarbons) that may then be extracted for use or sale. The system 10 may circulate the gas stream 34 such that the gas stream 34 is subjected to target temperature ranges for target time intervals, with the specific ranges and intervals being selected based on the time and temperatures needed to thermally crack the heavier hydrocarbon compounds into lighter hydrocarbon compounds. According to one embodiment, products of the system 10 may include torrefied materials, biochar, activated carbon precursors, liquid bio-oils, and gasses.

The system 10 may also be used to treat, reduce, and combust waste products, such as those occurring in other industries; for example, municipal solid waste, refuse, plastics, and agricultural byproducts. These waste materials may first undergo at least one TGP reaction that devolatilizes the materials. Devolatilization allows for thermal decomposition within the system 10 and treatment of potentially unwanted compounds prior to combustion of remaining solids, for example de-chlorination of polyvinylchloride contaminated construction/demolition waste, that if combusted untreated, or processed in/by conventional TGP systems/methods, may result in the production of toxic compounds such as dioxin.

The time needed for cracking of the heavy hydrocarbons into lighter hydrocarbons may be longer than the amount of time it takes for the gas stream 34 to pass through the length of the reactor drum 12. Thus, the system 10 may be calibrated such that the gas stream 34 (including the gases, vapors and or compounds generated from TGP reactions) are cycled through the reactor drum 12 multiple times. This may result in particular portions (e.g., heavy hydrocarbons) of the gas stream 34 being exposed to elevated temperatures (e.g., between about 400° F. and about 1,600° F.) for a time period in excess of the amount of time the particles are exposed to the elevated temperatures within the reactor drum 12.

The temperature used to crack the heavy hydrocarbons into lighter hydrocarbons and/or used for thermal decomposition of compounds may be higher than the temperature used for the torrefaction of particles. Thus, the system 10 may be calibrated such that the gas stream 34 (including the gases, vapors and/or compounds generated from TGP reactions) is cycled through the heat exchanger 60 to elevate the temperature above that used in the drum 12 (e.g., above between about 400° F. and about 2,400° F.

According to one embodiment, particular portions of the gas stream 34 may be exposed to elevated temperatures for about 100% to about 1000% of the time it takes for a solid particle to transit the length of the reactor drum. For example, the particular portions of the gas stream 34 may be circulated through the reactor drum 12 between at least 2 and 100 times.

The system 10 may include components that enable catalytic cracking of the heavy hydrocarbons within the gas stream 34 to the lighter hydrocarbons. According to one embodiment, the system 10 may include a catalyst (e.g., a fluidized or low-density bed of material) that the gas stream 34 passes through to promote cracking of the heavy hydrocarbons within the gas stream 34 into the lighter hydrocarbons.

The system 10 may contain a solid phase catalyst(s) and or catalytic elements to promote adsorption, cracking, reforming and/or separation of elements and or compounds from the gas stream 34. The system 10 may also include a catalyst(s) and or catalytic elements to modify the characteristics of the TGP reactions, and or modify the products/resultants generated during TGP reactions/system operation. The system 10 may include catalyst(s) and or catalytic elements which are regenerated or consumed during operation. The system 10 may include catalyst(s) and or catalytic elements which may be entrained in the gas stream 34 and circulated by the fan device 32. The system 10 may include catalyst(s) and or catalytic elements which are regenerated or consumed during operation. The system 10 may include catalyst(s) and/or catalytic elements which form a bed within in the drum, and for example, absorb chlorine and/or sulfur compounds.

The system 10 may contain the fluidized bed within the reactor drum 12 or as an external component. The system 10 may contain features to pass the circulating gas stream 34 through the fluidized bed, independently, or utilizing the gas loop as the primary means of fluidization. The system 10 may include catalyst(s) and/or catalytic elements in the fluidized bed and/or the bed material. The system 10 may include features to mechanically fluidize the bed, (e.g., holes, screens, and/or flights incorporated into the reactor drum 12). The system 10 may also include additional elements and/or compounds to the fluidized bed to promote/initiate additional reactions. The system 10 may include features, systems, and/or mechanisms to introduce an oxidizing agent containing from about 1% to about 100% oxygen for the purposes of combustion and or oxidation reactions within the bed.

As shown in the illustrated embodiment, the heat source 30 may be in the form of a gas-to-gas heat exchanger 60. A hot gas stream 35 (e.g., in the range of about 800° F. to about 2400° F.), may be supplied to the heat exchanger 60 via an inlet conduit 62. The hot gas stream 35 may interact with the recirculating gas stream 34 of the system 10 as shown to transfer heat thereto. In some embodiments, the heat exchanger 60 may raise the inlet temperature of all or a portion of the recirculating gas stream 34 into the heat exchanger 60 (e.g., from about 500° F.±100° F. to an outlet temperature of about 1,600° F.±150° F.).

Figure 2:
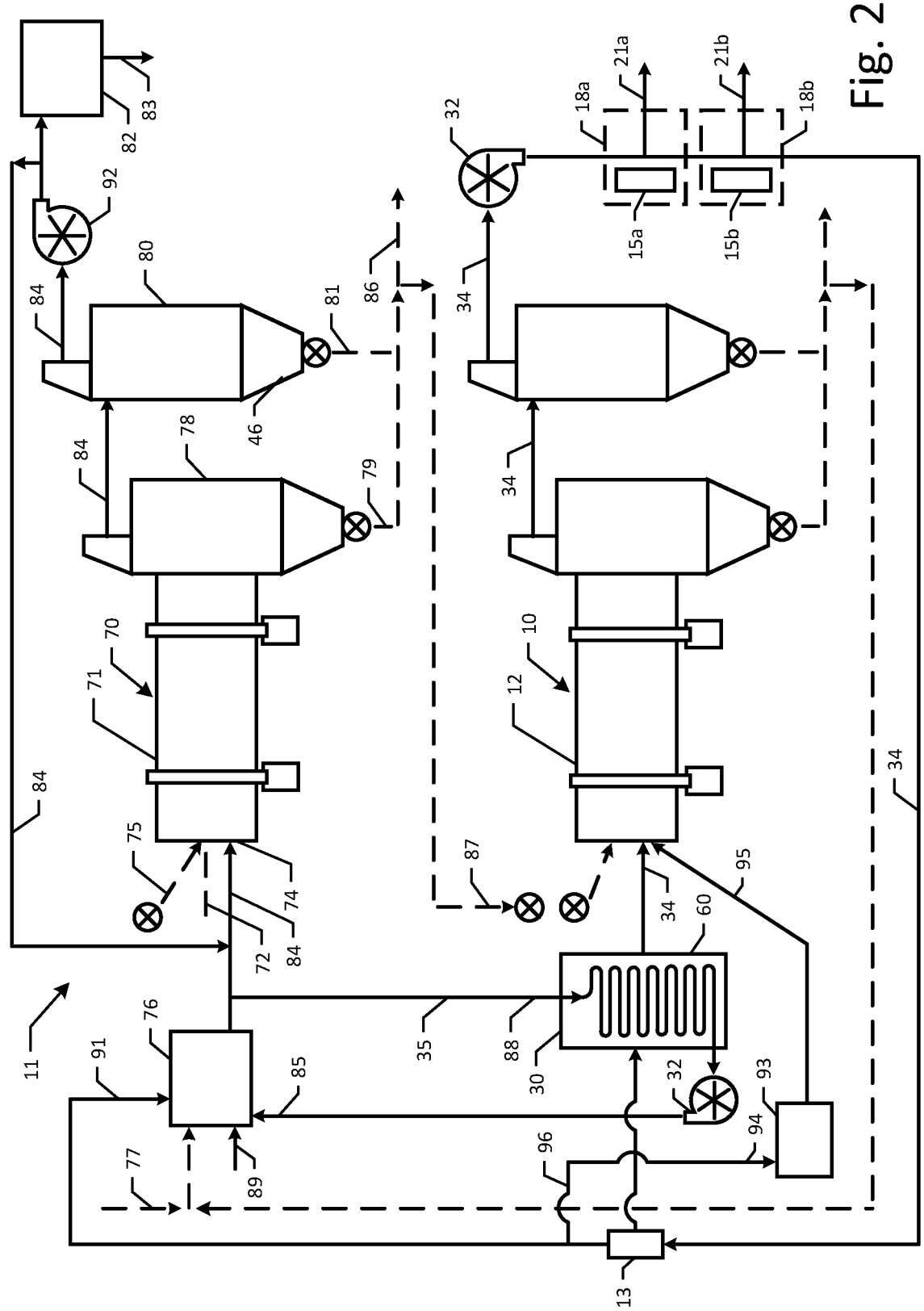
FIG. 2 is a schematic diagram of an integrated processing system according to one embodiment.

In doing so the temperature of the hot gas stream 35 in the heat exchanger 60 is necessarily lowered before exiting the heat exchanger 60 via an outlet conduit 66. The temperature of the hot gas stream 35, however, may still be sufficiently hot to be useful in other processes, such as, for example, drying the particles prior to entry in the system 10. Accordingly, in some embodiments, the hot gas stream 35 discharged from the heat exchanger 60 via the outlet conduit 66 may be routed to a dryer system 70 (as shown in FIG. 2) or other device. In some embodiments, the discharged hot gas stream 35 may be routed back to the inlet of the heat exchanger 60 and blended with other heated gas having a higher temperature, such as, for example, other heated gas routed from a burner 76, to regulate the inlet temperature of the hot gas stream 35 when entering the heat exchanger 60 to a desired level or to fall within a desired temperature range.

Although the illustrated embodiment of the heat source 30 of FIG. 1 is shown as a gas-to-gas heat exchanger 60, it is appreciated that other various heat sources 30 may be provided. For example, in some embodiments, an electric immersion-type heat source may be provided within the path of the gas stream 34 of the system 10. In other embodiments, low oxygen burners may be directed directly into the system 10 to heat the gas stream 34 without significantly increasing the oxygen level within the system 10. Irrespective of the heat source 30, however, it may be beneficial to isolate the gas stream 34 in a recirculating manner to facilitate maintenance of a low level oxygen environment within the reactor drum 12 that is conducive to torrefying particles.

The system 10 may include (e.g., at the downstream end of the reactor drum 12) a separator hopper 38 that collects torrefied particles (e.g., torrefied wood chips, torrefied giant cane chips, other torrefied cellulosic biomass) as the particles exit the reactor drum 12. These particles may then be fed mechanically and/or under the force of gravity towards an outlet 40 for collection. One or more airlock devices 42 may be coupled to the outlet 40 so as to substantially prevent oxygen from infiltrating the system 10 as the torrefied particles are withdrawn from the system 10.

Smaller particles (e.g., torrefied wood fines, torrefied giant cane fines, other torrefied cellulosic biomass) which may pass through the separator hopper 38 may be filtered and removed from the gas stream 34 by a filtering device 44 (e.g., a cyclonic type filtering device). One or more additional airlock devices 46 may be coupled to a secondary outlet 48 for removing the filtered material from the system 10 without introducing significant amounts of oxygen into the system 10. As shown, the smaller particles exiting the separator hopper 38 via the one or more airlock devices 46 may be directed to be mixed/combined with the torrefied particles that exit the separator hopper 38.

In some embodiments, a chamber or space between a pair of sequentially aligned airlocks 42, 46 may be coupled to a source of steam, an inert, or semi-inert gas source that selectively purges the chamber or space, as represented by the arrows labeled 43 and 47. In some embodiments, the system 10 may include a cyclonic type filtering device in lieu of a hopper 38 to separate and/or filter torrefied particles from the gas stream 34. In some embodiments, the system 10 may include one or more pneumatic discharge devices (not shown) to discharge torrefied particles from the system 10.

As previously described, the gas stream 34 may be drawn or forced through the reactor drum 12 and returned to the heat source 30 (e.g., after separating torrefied particles, chips, fines, dust and/or any debris) under the influence of the fan device 32. While the substantial majority of the gas is recirculated, some gas may be diverted to exhaust ducting 50. The gas exhausted through the exhaust ducting 50 can be used elsewhere in the process or another process, as represented by the arrow labeled 52. For instance, the exhaust gas may be used as fuel to generate heat to aid the heat source 30 in increasing the temperature of the gas stream 34 (e.g., via fuel inlet 23 of the burner 76). The burner 76 may run on "supplemental fuel" sources (e.g., fuel added to the system 10, rather than produced by the system 10) via the fuel inlet 23 and an oxygen inlet 25. The gas ducts 36 (e.g., the exhaust ducting 50) may include a variable position damper 54 which may be used to balance the pressure inside the reactor drum 12 from slightly negative to slightly positive. Depending on the setting, this can be used to inhibit oxygen from entering the system 10.

Referring to FIG. 2, an embodiment of an integrated processing system 11 (e.g., a torrefaction, gasification, and/or pyrolysis system) is shown in schematic form. The system 11 may include, among other things, the system 10 described above and a dryer system 70 that dries particles prior to introduction into the system 10. In some embodiments, the system 10 may receive particles having a moisture content reduced to below twenty percent moisture content, wet-weight basis by the dryer system 70. In some embodiments, the biomass particles may be wood chips having an average particle size between about 1/16 cubic inch and about one cubic inch and having an initial moisture content above forty percent moisture content, wet-weight basis. In some embodiments, the particles may have a substantially consistent size (less than ten percent difference), and in other embodiments, the size of the particles may vary by up to ten percent, up to twenty percent, up to thirty percent, or more.

As shown the dryer system 70 may include a rotary drum 71 supported so as to rotate about a longitudinal axis 72 of the rotary drum 71. The dryer system 70 may further include an inlet 74 that receives particles that are to be processed, as represented by the arrow labeled 75. The particles may be fed to the inlet 74 via a conveyor or other conventional material transport mechanism.

The dryer system 70 may be coupled to a burner (e.g., the burner 76) that feeds a heated gas stream, as represented by arrows 84, through the rotary drum 71 to heat and dry, and may additionally carry (e.g., intermittingly) particles through the drum 71 as it rotates. According to one embodiment, the heated gas stream 84 may simultaneously dry the particles as the heated gas stream propels the particles through the rotary drum 71. The burner 76 may be configured to burn bark, hogged fuel, or other fuels (e.g., waste wood) to heat the heated gas stream 84 fed to the dryer system 70. The heated gas stream 84 entering the dryer system 70 may also be supplemented or blended with other gas streams of the integrated processing system 11 as described in further detail elsewhere herein.

At the downstream end of the rotary drum 71, the integrated processing system 11 may include a separator hopper 78 that collects dried particles (e.g., dried wood chips, dried giant cane chips, other dried cellulosic biomass) as the particles exit the rotary drum 71. These particles may then be fed mechanically and/or under the force of gravity towards an outlet 79 for collection for subsequent use or packaging. Smaller particles and dust (e.g., dried wood fines, dried giant cane fines, other dried cellulosic biomass) which may pass through the separator hopper 78 may be filtered and removed from the heated gas stream 84 by a filtering device 80, such as, for example a cyclonic type filtering device. These particles may be fed towards a secondary outlet 81 for subsequent use or packaging. In some embodiments, the dryer system 70 may include a cyclonic type filtering device in lieu of a hopper 78 to separate and/or filter dried particles from the heated gas stream. In some embodiments, the dryer system 70 may include one or more pneumatic discharge devices (not shown) to discharge dried particles from the dryer system 70.

A fan device 92 may be provided to draw or force the heated gas stream through the rotary drum 71 and to route exhaust gas from the rotary drum 71 toward environment emission control equipment 82 to process the exhaust of the dryer system 70 before release to the environment or to other systems, as represented by the arrow labeled 83. As an example, the emission control equipment 82 may include a wet electrostatic precipitator (WESP) to facilitate the removal of sub-micron sized solid particles and liquid droplets from the exhaust gas stream. The emission control equipment 82 may further include a regenerative thermal oxidizer (RTO) to destroy air toxins and volatile organic compounds (VOCs) that may be present in the exhaust gas. In some embodiments, an RTO may be provided which uses natural gas to heat the exhaust gasses to about 1500° F. where VOCs are oxidized. In other embodiments, torrefier off-gasses may be used for heating of the RTO which may significantly reduce the operating cost of the RTO since natural gas is otherwise a significant cost in operating such equipment.

At least a portion of the exhaust from the dryer system 70 may be routed or recycled back towards the inlet 74 of the rotary drum 71 (e.g., via ducting) and combined with heated gas from the burner 76 to dry the particles which are continuously fed into the rotary drum 71. Additional gases from the outlet of the heat exchanger 60 of the system 10 may also be combined with the exhaust gases from the dryer system 70 for cleansing prior to discharge into the environment and/or for introduction back into the dryer system 70, as represented by the arrows labeled 85.

According to the illustrated embodiment of FIG. 2, the dried particles (e.g., dried wood chips and fines) may be routed to another location for subsequent processing, storage or packaging of the dried particles as a standalone commodity, as represented by the arrow labeled 86. A portion or the entire supply of the dried particles may be routed to the system 10 for subsequent processing, as indicated by the arrow labeled 87.

As shown in FIG. 2, the dried particles generated via the dryer system 70 may serve as input material for the system 10. In some embodiments, the dried particles may have an average moisture content below twenty percent moisture content, wet-weight basis when entering the system 10. In other embodiments, the average moisture content of the dried particles may be between about five percent moisture content, wet-weight basis and about fifteen percent moisture content, wet-weight basis. In still other embodiments, the average moisture content of the dried particles may be greater than twenty percent moisture content, wet-weight basis.

Although the dryer system 70 is illustrated as a rotary drum type dryer system, such as those designed and marketed by Teal Sales Incorporated, the assignee of the present application, it is appreciated that other dryer systems may be utilized in connection with embodiments of the present invention, including, for example, kilns having rotary screw and conveyor bed type conveyance mechanisms. Accordingly, embodiments of the particle processing systems described herein are not limited to the specific dryer systems illustrated, but may incorporate a wide range of conventional dryer systems.

As shown the system 11 may include the heat source 30 (e.g., the gas-to-gas heat exchanger 60) that receives a heated gas stream (e.g., the heated gas stream 35 from the burner 76) as indicated by the arrow labeled 88. The heated gas stream entering the heat exchanger 60 may be blended with gases from an output of the heat exchanger 60, (e.g., via the burner 76) to regulate the input temperature of the heated gas stream entering the heat exchanger 60. In some embodiments, the inlet temperature of the gas stream entering the heat exchanger 60 may be between about 600° F. and about 1400° F., and in some embodiments, the inlet temperature of the gas stream entering the heat exchanger 60 may be between about 800° F. and about 1000° F.

The recirculating gas stream 34 of the system 10 that passes through the heat exchanger 60 may be heated, according to some embodiments, to a reactor drum inlet temperature of at least 500° F. After passing through the reactor drum 12 the heated gas stream may have a reactor drum outlet temperature of at least 400° F. Consequently, the particles which are passed through the reactor drum 12 during operation may be directly subjected to a heated gas stream having a temperature of at least 400° F. over the entire length of the reactor drum 12. In some embodiments (e.g., when processing cellulosic biomass), the reactor drum inlet temperature is about 700° F.±150° F. and the reactor drum outlet temperature is about 500° F.±100° F. The reactor drum inlet and outlet temperatures may be vary to correspond to processing temperatures for other particles (e.g., those containing plastics). The reactor drum inlet and reactor drum outlet temperatures of the heated gas stream may be monitored with appropriate temperature sensors and controlled via a generic or cascaded control loop to maintain the temperature gradient through the reactor drum at a desired level during operation.

Exhaust gases from the torrefaction, gasification, and/or pyrolysis process may be routed, according to some embodiments, to the burner 76 for combustion, as indicated by the arrow labeled 91. The exhaust gases from the torrefaction, gasification, and/or pyrolysis process may include hydrocarbon compounds that "boiled out of" (i.e., evolved during the torrefaction of) the particles in addition to other components such as water vapor and any ambient air that leaks into the system. The system 11 may include a separator 13, which separates all or a portion of the hydrocarbon compounds from a remainder the exhaust gases. Thus, the system 11 may direct the hydrocarbon compounds back toward the reactor drum 12 thereby retain the hydrocarbon compounds and increasing their exposure time to enable the thermal/catalytic cracking of the hydrocarbon compounds into lighter hydrocarbon compounds. The separator 13 may direct at least a portion of the remainder of the exhaust gases (e.g., tars or other leftover hydrocarbons) to the burner 76 for combustion.

In this manner, energy contained in the exhaust gasses can be utilized to heat a heat transfer medium for use in the heat exchanger 60 to maintain the heated gas stream 34 flowing through the reactor drum 12 at a desired elevated inlet temperature. The reactor drum temperature gradient may be controlled through a cascaded control loop which sets the reactor drum inlet temperature. The reactor drum inlet temperature may be controlled, for example, by varying the amount of heated gas fed to the heat exchanger 60 from the burner 76.

According to one embodiment, the burner 76 may run primarily on torrefied particles that exit the reactor drum 12 as the primary source of fuel (supplemented during startup/shutdown, and other non-steady state conditions). In some embodiments, the burner 76 may accept supplemented fuel, as represented by the arrow 77. The burner 76 may include an air intake, represented by the arrow 89 to aid in the combustion process. According to one embodiment the burner 76 may burn bark, hogged fuel or other fuel to heat the gas stream 35 fed through the heat exchanger 60. Heating of this gas stream 35 may be supplemented with the combustion of exhaust gases from the system 10, as represented by the arrow labeled 91.

In some embodiments, steam from a separate boiler of a steam plant 93, which may be fired by the exhaust gas of the reactor drum 12 (as represented by the arrow labeled 94) or another fuel or heat source may be injected into the system 10 (as represented by the arrow labeled 95) to further control oxygen in the process or as a safety smothering and cooling stream and also may be used as an inert or semi-inert purge gas in the process. In addition, using steam as part of the process gas which passes through the reactor drum 12 may also improve heat transfer to the particles. In some embodiments, the boiler may be heated by off gas routed thereto by ducting 96 coupled to the reactor drum 12. In other embodiments, the steam plant 93 may be heated by the burner 76 or another heat source. In some embodiments, upon a fault condition, steam may be introduced into the reactor drum 12 in sufficient quantities to smother and/or cool the particles. In this manner, operational safety of the system 10 may be enhanced.

As shown, the system 11 (e.g., the system 10) may include one or more of the regions 18. The one or more regions may include a first region 18*a* and a second region 18*b* as shown. Each of the one or more regions 18 may be calibrated to enable extraction of specific compounds from the gas stream 34. According to one embodiment, the first region 18*a* may include at least one first component 15*a*, and the second region 18*b* may include at least one second component 15*b*.

According to one embodiment, the first region 18*a* may include both a first temperature range and first pressure range that result in a first liquid dropping-out of the gas stream 34. The second region 18b may include both a second temperature range and a second pressure range that result in a second liquid dropping-out of the gas stream 34. According to one embodiment, the first temperature may be different than the second temperature, and the first temperature and the second temperature may be different than a temperature of the exhaust gas upon exiting the reactor drum 12. According to one embodiment, the first pressure may be different than the second pressure, and the first temperature and the second pressure may be different than a pressure of the exhaust gas upon exiting the reactor drum 12. According to one embodiment, pressure of the gas stream 34 remains substantially constant, while the one or more regions 18 alter the temperature of the gas stream 34.

According to one embodiment, the first region 18a separates a first target compound from a remainder of the gas stream 34 without transitioning the first target compound from a gas phase to a liquid phase. According to one embodiment, the second region 18b separates a second target compound from a remainder of the gas stream 34 without transitioning the second target compound from a gas phase to a liquid phase. The first target compound, whether in liquid phase, gas phase, solid phase, or a combination thereof may be removed from the system 11 via a first outlet 21a. The second target compound, whether in liquid phase, gas phase, solid phase, or a combination thereof may be removed from the system 11 via a second outlet 21b.

Referring to FIGS. 3 through 8 a torrefaction, gasification, and/or pyrolysis system 110 according to one embodiment may be similar to the system 10 described earlier such that the disclosure directed to the system 10 is also applicable to the system 110, with differences described below. According to one embodiment, the system 110 may include additional structural components, a different heat source 130, or both. The system 110 may include a reactor drum 112 (e.g., the reactor drum 12) supported on a structural frame 114 to rotate about a longitudinal axis 116. The reactor drum 112 may be driven by a drive motor 118 which may be electrically coupled to a control system that selectively controls the rotation of the reactor drum 112 and optionally adjusts the speed thereof. The control system may include a control panel 120 with appropriate controls (switches, dials, gauges, touchscreen, etc.) that selectively control and monitor the system 110. Other gauges and controls (e.g., sensors, valves, etc.) may be remotely located and coupled to specific components of the system 110 for monitoring and control purposes.

The system 110 may further includes an inlet 122 (e.g., the inlet 22) in the form of a chute that receives particles (e.g., biomass particles) that are to be processed, as represented by the arrow labeled 124. An airlock or dual airlock 126 (e.g., the airlock 26) with optional steam, inert, or semi-inert gas purging or similar device may be coupled to the inlet 122 to substantially prevent oxygen from entering the system 110 when particles are input. The particles may be fed to the inlet 122 via a conveyor or other conventional material transport mechanism. The rate of introduction of particles may be monitored and controlled to optimize or tailor characteristics of the resultant torrefied particles. Stairs 128 or other access devices may be provided for a user to access the inlet 122 and other components of the system 110 for monitoring, maintenance and other purposes.

The system 110 may also include a heat source 130 (e.g., disposed upstream of the reactor drum 112 as shown) that supplies heat to a gas stream that is generated in the system 110 (e.g., by a fan device 132, such as the fan device 32), which may be, for example, an induced draft fan device or a forced draft fan device. The fan device 132 may be driven by a drive motor 134 to draw or force gas through the reactor drum 112 and circulate it back to the heat source 130 to be reheated and supplied to the reactor drum 112 in a recirculating manner. The system 110 may include gas ducts 136 appropriately sized and coupled to at least the reactor drum 112, heat source 130, and fan device 132 for this purpose.

At the downstream end of the reactor drum 112, there may be provided a separator hopper 138 (e.g., the separator hopper 38) that separates torrefied particles from the gas stream as the particles exit the reactor drum 112. These particles may then be fed mechanically and/or under the force of gravity towards an outlet 140 for collection for subsequent use or packaging. An airlock device 142 (e.g., the airlock device 42) may be coupled to the outlet 140 to substantially prevent oxygen from infiltrating the system 110 as the torrefied particles are withdrawn.

Smaller particles and dust which may pass through the separator hopper 138 may be filtered and removed from the gas stream by a filtering device 144 (e.g., the filtering device 44), such as, for example a cyclonic type filtering device. Another airlock device 146 (e.g., the airlock device 46) may be coupled to a secondary outlet 148 that removes the filtered material from the system 110 without introducing significant amounts of oxygen into the system 110. In some embodiments, the system 110 may include a cyclonic type filtering device in lieu of a hopper 138 to separate and/or filter torrefied particles from the gas stream passing through the reactor drum 112. In some embodiments, the system 110 may include one or more pneumatic discharge devices (not shown) to discharge torrefied particles from the system 110.

As previously described, the gas stream may be drawn or forced through the reactor drum 112 and returned to the heat source 130 (e.g., after separating torrefied particles, dust and any debris) under the influence of the fan device 132. While the substantial majority of the gas may be recirculated to the reactor drum 112, some gas may be diverted to an exhaust stack 150. The gas exhausted through the stack 150 can be recaptured for use elsewhere in the process or another process, such as, for example, used as fuel to generate heat. The stack 150 can include a variable position damper 152 which may be used to balance the pressure inside the reactor drum 112 from slightly negative to slightly positive. Depending on the setting, this can be used to inhibit oxygen from entering the system 110.

Figure 7:
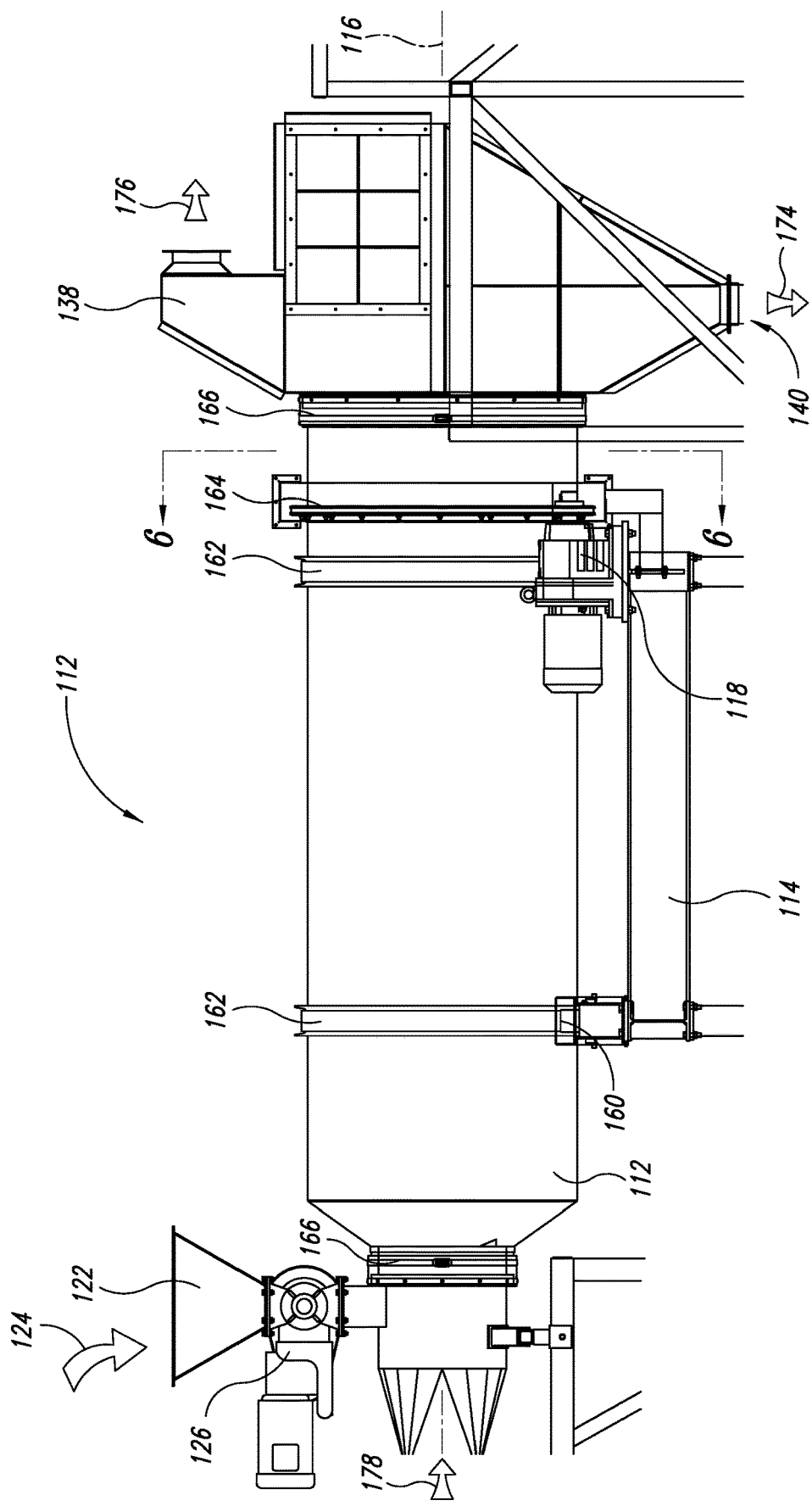
FIG. 7 is a side elevational view of a reactor drum and adjacent components of the system of FIG. 3.
Figure 8:
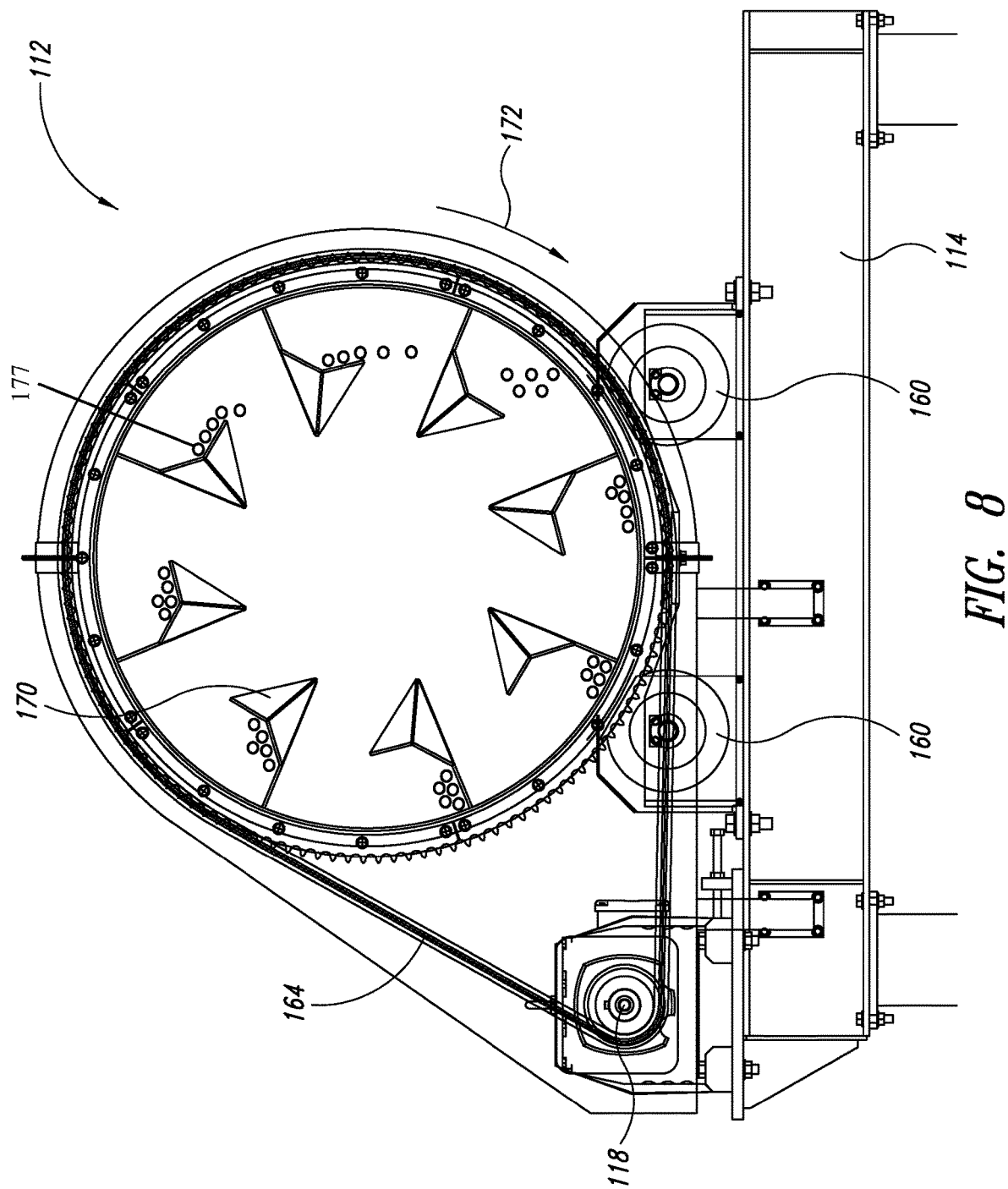
FIG. 8 is a cross-sectional view of the reactor drum of FIG. 7 taken along line 6-6.

Further details of the reactor drum 112 will now be described with reference to FIGS. 7 and 8. As shown in the illustrated embodiment, the reactor drum 112 may be supported in a horizontal orientation on a number of rollers 160. The rollers 160 may contact the drum 112 along bearing tracks 162 that are secured to a circumference of the drum 112. The diameter of the drum 112 may be three feet, four feet, five feet, or more (e.g., up to twenty feet or more), and may be configured to receive and process over fifty tons of torrefied biomass particles per hour.

The drive motor 118 may be coupled to a drive belt or chain 164 and controlled via the control system to selectively rotate the drum 112 at various speeds, such as, for example, about 3 rpm or more or less. High precision seals 166 are disposed between the rotating drum 112 and static components to prevent the infiltration of oxygen into the system. In this manner, the seals 166 and other features of the system are able to maintain the gas stream at a consistent low level of oxygen by creating a substantially sealed vessel.

Within the reactor drum 112, there may be a number of the lifting flights 170 spaced circumferentially at each of a plurality of locations along a longitudinal length thereof.

The density of the lifting flights 170 may be designed to suit various needs of the system 110 and may be dependent on a number of interrelated factors, such as, for example, the speed of rotation of the reactor drum 112, the rate of material fed into the system 110, and the speed of the fan device 132 or strength of the heated gas stream passing through the reactor drum 112.

The flights 170 may be configured to lift particles (represented by circles labeled 177) as the reactor drum 112 rotates in the direction indicated by arrow 172 and then direct and shower the particles 177 into the gas stream to be intermittingly carried along the length of the reactor drum 112 predominately by the kinetic energy of the gas stream and simultaneously torrefied. As shown, the flights 170 may be fixed to the reactor drum 112 such that they rotate about the longitudinal axis 116 with the reactor drum 112. The flights 170 may include a scoop-like shape that scoops up and suspends the particles (e.g., such that the particles are spaced away from a periphery of the reactor drum 112 during at least a portion of the rotation. For illustration purposes five "particles" 177 are shown being carried by each flight 170. As the flights 170 rotate with the particles in contact with the flights, movement of the particles is minimal (or zero). Once the flights reach a certain point in their respective rotation (e.g., about 3 o'clock as shown in FIG. 8) the particles fall out of the flight 170 and are "showered" into the heated gas stream flowing through the reactor drum 112. While falling the heated gas stream carries the particles along a portion of the length of the reactor drum 112.

This is advantageous in that the transport mechanism for the particles provides a highly efficient medium for transferring heat to the particles directly. Accordingly, large volumes of particles can be processed by a system with reduced energy demands. In addition, the throughput or rate of torrefied biomass particles (tons/hour) may be relatively greater when compared to conventional torrefaction systems of generally comparable size.

The system 110 (e.g., the flights 170 of the reactor drum 112) may be calibrated such that it generally takes a number of rotations of the reactor drum 112 to provide enough forward progress of the particles (via repeated dropping into the heated gas stream) to gain passage through the length of the reactor drum 112. The showering and conveying process within the drum 112 may also classify the particles. Lighter, smaller particles may pass through the drum 112 faster than heavier, larger particles, as the larger, heavier particles fall more quickly and/or are advanced less distance along the length of the reactor drum 112 with each successive "showering" compared to the smaller, lighter particles. This allows large particles to remain in the drum 112 for a relatively longer residence time and creates a more uniform end product (i.e., large and small particles may be processed together to have similar end characteristics despite differences in mass and volume).

For example, in some embodiments, particle size may vary within a particular run of torrefied particles by between ten percent and twenty percent, between ten percent and thirty percent, or more than thirty percent (e.g., up to 100% or more) while the energy density and moisture characteristics of the particles are maintained relatively consistent irrespective of particle size. In some embodiments, the flights 170 may be designed to vary with respect to location and/or flight density in different embodiments to affect the residence time of the particles within the reactor drum 112.

The particles reside in the drum 112 for a period of time and then may be subsequently discharged into the separator hopper 138 or other separating device and routed in the direction indicated by the arrow labeled 174 for further handling. A predominate or substantial portion of the gas stream may be routed in the direction indicated by the arrow labeled 176 and recirculated, heated and reintroduced into the reactor drum 112 as indicated by the arrow labeled 178. The recirculation and reheating may be calibrated to facilitate cracking of larger hydrocarbons boiled off of the particles by the torrefaction, gasification, and/or pyrolysis process into smaller/lighter hydrocarbons as described in detail above.

The system 110 thus may enable a continuous torrefaction, gasification, and/or pyrolysis process that involves the introduction of particles into a rotating reactor drum 112 via an airlock or the airlocks 126 to maintain a low oxygen level inside the system 110 which is conducive to torrefying particles. The particles may be conveyed through the reactor drum 112 by the kinetic energy of a heated gas stream that is generated by creating an induced draft of forced draft via a fan device 132 connected by a duct 136 to the outlet of the drum 112, or alternatively by a conventional means of conveyance (e.g., mechanical screw).

Figure 3:
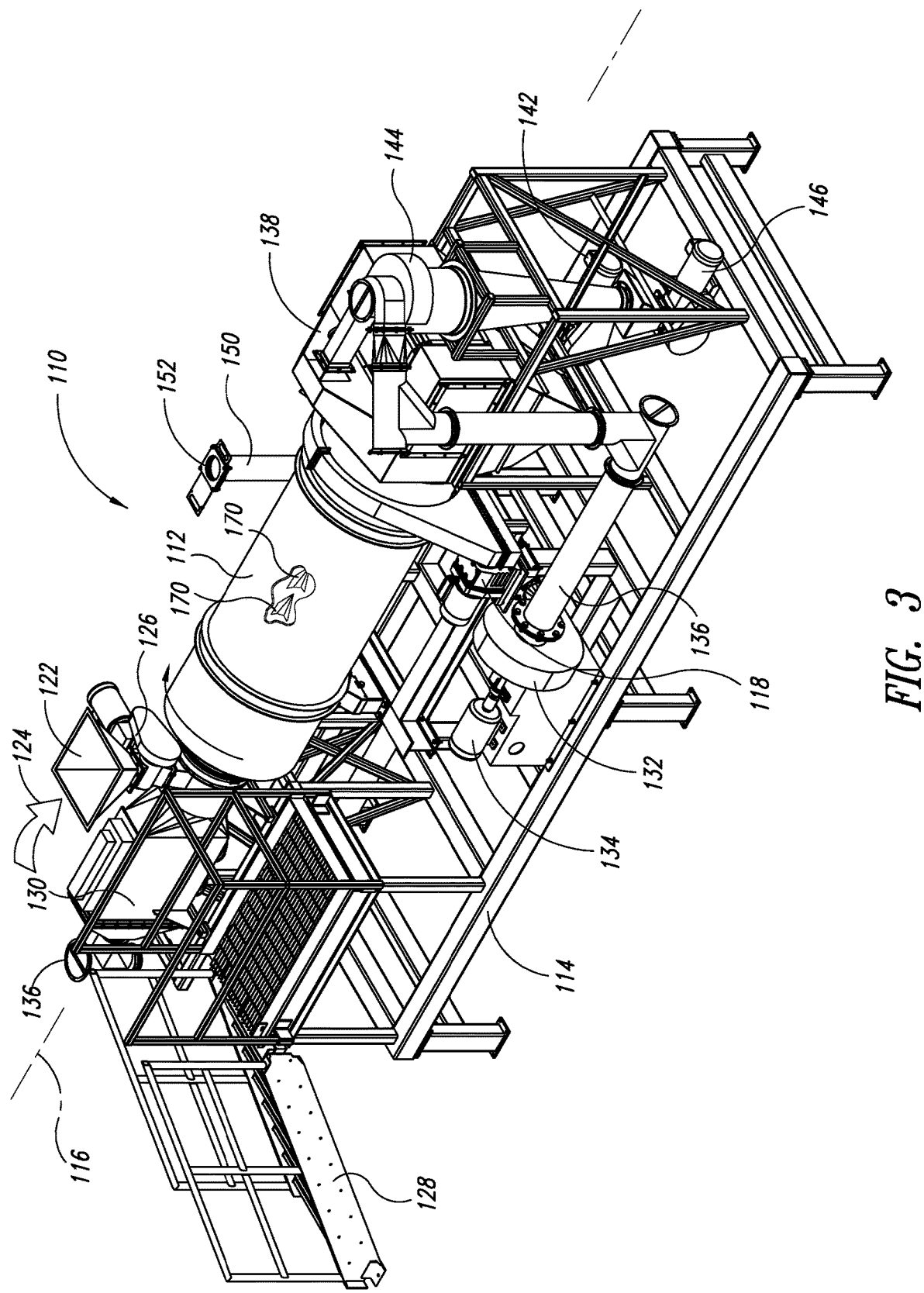
FIG. 3 is a isometric view of a system according to another embodiment.
Figure 4:
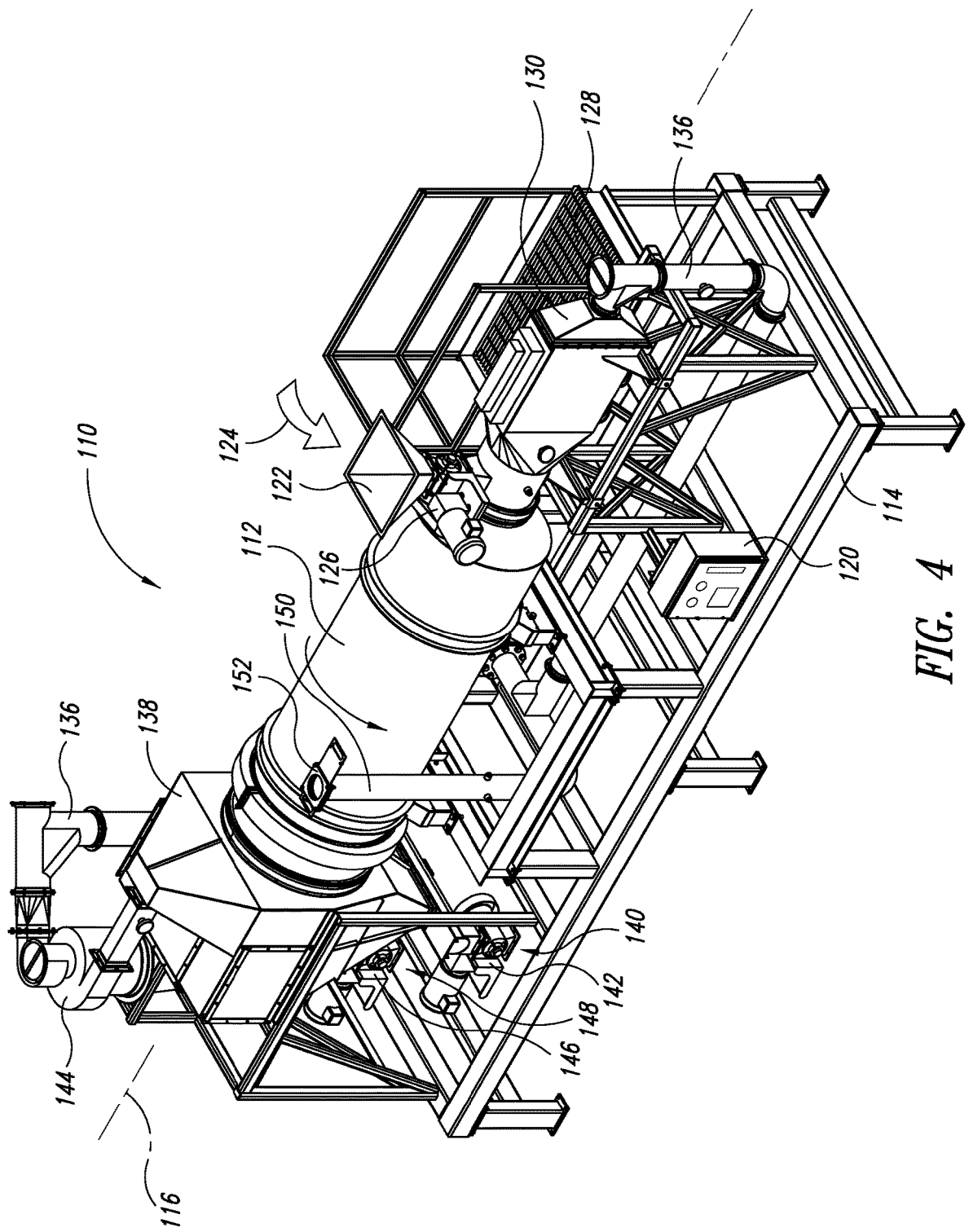
FIG. 4 is a rear isometric view of the system of FIG. 3.

The system 110 may include a heat source 130 upstream of the reactor drum 112, such as, for example, an electrical immersion-type duct heater (as shown in FIG. 3) or a gas-to-gas heat exchanger (as shown in FIG. 1). The fan device 132 may draw or force gas across or through the heat source 130 and through the reactor drum 112. Beneficial to the viability of the process is the recirculation of gas exiting the drum 112 back to the heat source 130 for reheating. Also beneficial to the viability of the process is the ability of the heated gas stream to directly heat the particles under a low oxygen environment as the gas stream simultaneously transports the particles intermittently through the reactor drum 112, as discussed in more detail elsewhere.

Figure 5:
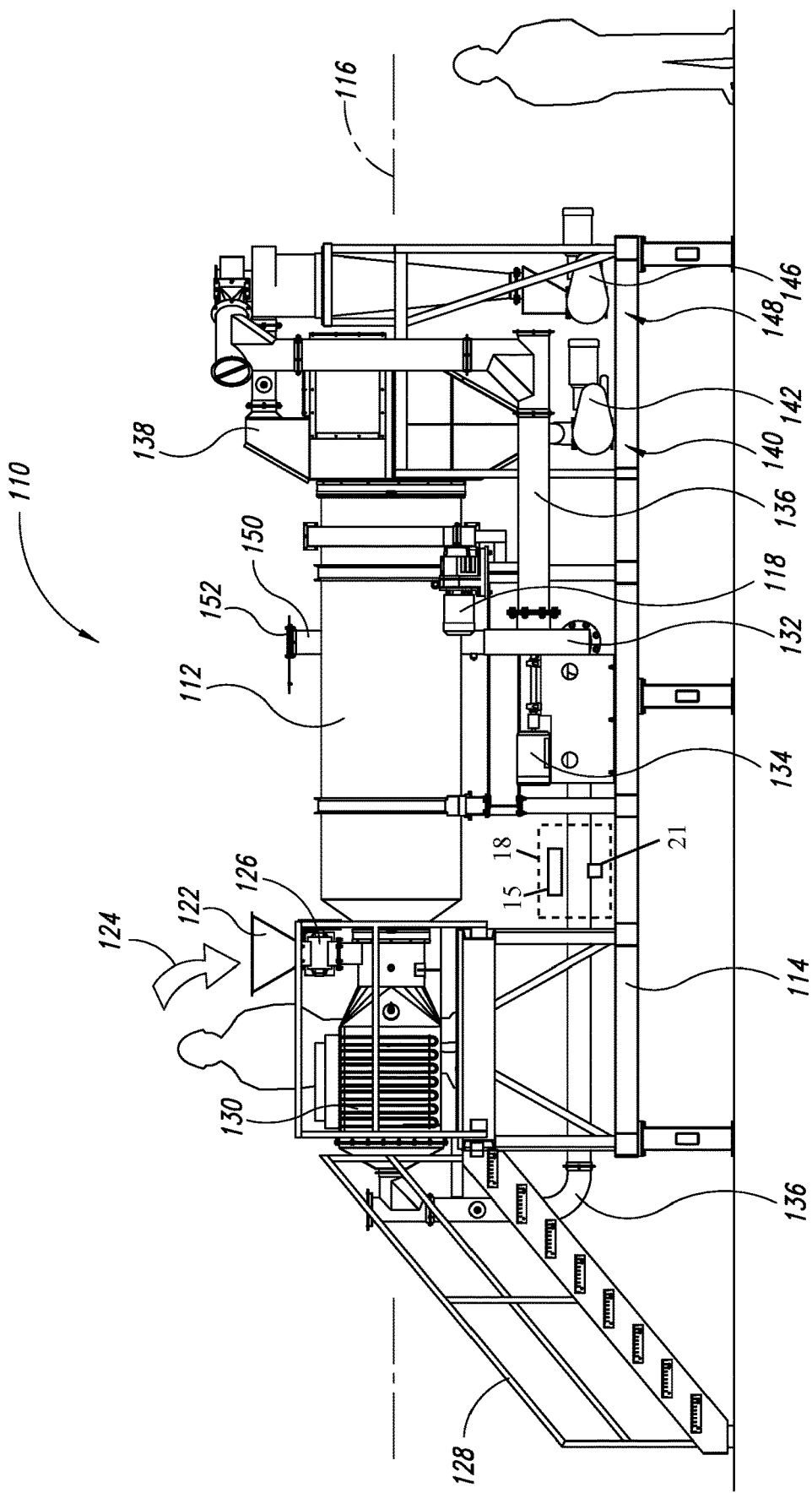
FIG. 5 is a side elevational view of the system of FIG. 3.
Figure 6:
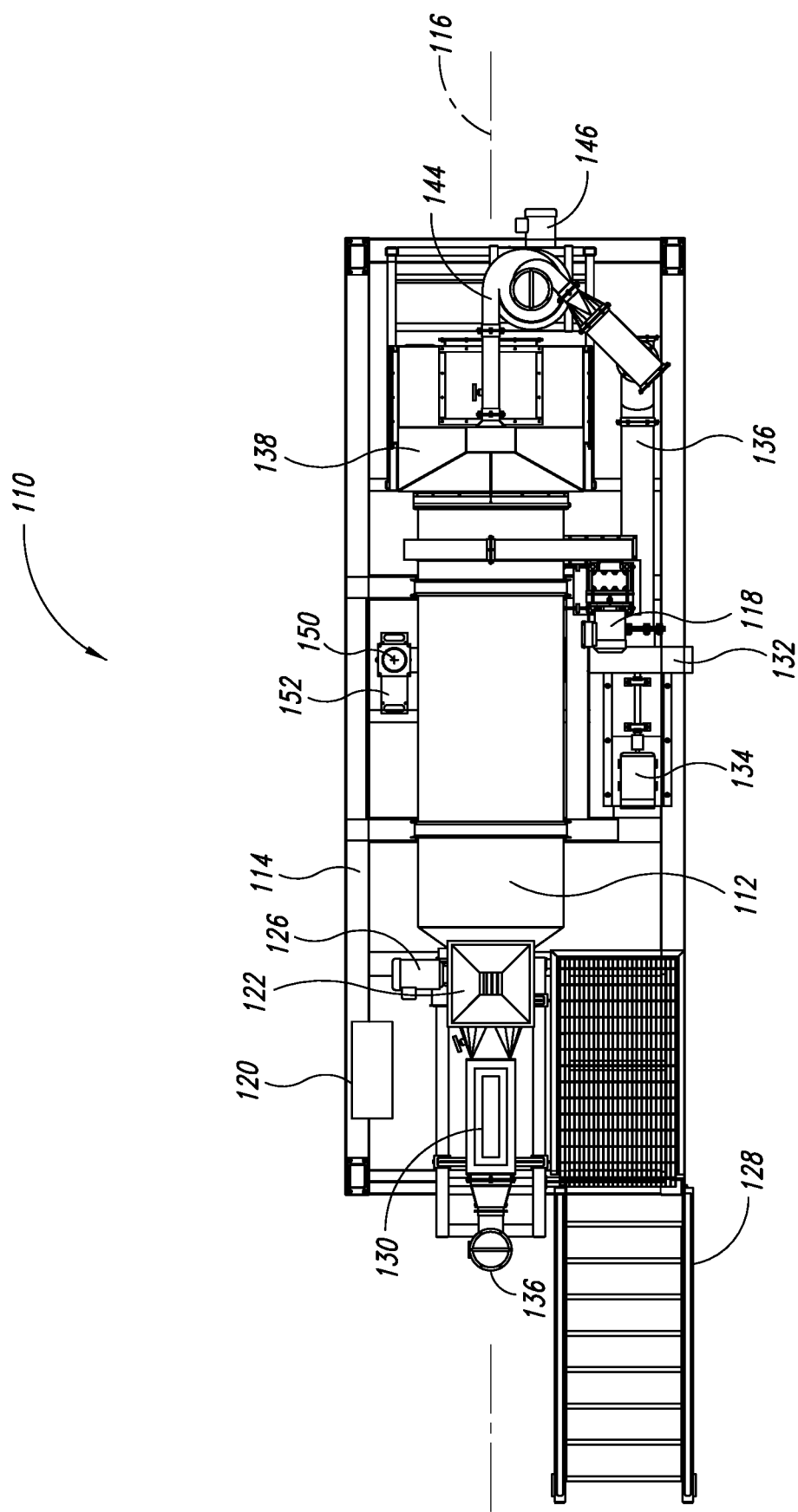
FIG. 6 is a top plan view of the system of FIG. 3.

The system 110 may include components that remove/discharge an amount of gas from the system 110 (e.g., an amount substantially equal to the sum of the gases being driven off of the particles due to heating and any leakage that may enter the system 110). As shown in FIG. 5, the components that remove/discharge the amount of gas may include the region 18, the components 15, and the outlet 21 as described above. The components that remove/discharge the amount of gas may further include a discharge to the external environment or another related or unrelated process component.

When using the system 110 to torrefy biomass particles the heat source 130 may add heat to recirculating gas within the system 110. The heated gas stream that recirculates within the system 110 in turn may directly heat the particles as they are conveyed through the system 110. In this manner, the heated gas stream directly heats and may also transport the particles simultaneously. This is advantageous in that the transport mechanism for the particles provides a highly efficient medium for transferring heat to the particles directly. Accordingly, large volumes of biomass particles can be processed by a system with reduced energy demands. In addition, the throughput or rate of torrefied biomass particles (tons/hour) may be relatively greater when compared to conventional torrefaction systems of generally comparable size. This advantageously enables the systems described herein to be implemented in a particularly commercially feasible manner.

Elements of the heat source 130 can provide heat by any readily available energy source. In some embodiments, for example, direct heat may be applied to the gas stream by an electric element (e.g., electrical immersion-type duct heater 130). In other embodiments, heat may be provided to the gas stream through a gas-to-gas heat exchanger 60 (as shown in FIGS. 1 and 2) coupled to a combustion and/or waste heat system (e.g., the burner 76 of FIGS. 1 and 2). In another embodiment, low oxygen burners may be directed directly into the system 110 to heat the gas stream without significantly increasing the oxygen level within the system 110. According to one embodiment, heat may be provided to the gas stream by the localized introduction of an oxidizing agent, containing from about 1% oxygen to about 100% oxygen.

In some embodiments, exhaust gas that is discharged from the stack 150 may be used as part of the process heating fuel. According to one embodiment, the torrefied particles that exit the reactor drum 112 may be directed consumed as fuel for the heat source 130. Irrespective of the heat source 130, very little additional oxygen may be added to the system 110 throughout the heating portion of the process.

The torrefaction, gasification, and/or pyrolysis systems and processes may be based on a heat and energy balance that balances the energy required with the process rate, heating source, and required residence time. Embodiments of the torrefaction, gasification, and/or pyrolysis systems and methods described herein are particularly well suited to manipulate and control these factors and provide systems and methods that are readily scalable to meet various industry needs.

For instance, residence time of the particles within the reactor drum 112, the gas stream (e.g., hydrocarbons boiled off of the particles within the reactor drum 112), or both may be controlled by various design and process factors. For example, the speed and size of the fan device 132 may be selected to adjust the velocity of the circulating heated gas within the drum 112. In addition, the speed and volume of the heated gas stream can also be adjusted by a fan inlet damper of the fan device 132. As another example, the rotation speed of the drum 112 may be set higher of lower to adjust the rate of the lifting and showering effect within the drum 112 thus creating more or less time in which the particles are in suspension.

Further, since the flights 170 may be designed to work over a wide range of rotational speeds, the drum 112 rotational speed may be selectively adjusted by appropriate controls (such as a variable speed drive motor) to adjust the residence time. Also, density of the flights 170 within the reactor drum 112 may be used to change the flow conditions inside the reactor drum 112 giving an individual design an inherent shorter or longer residence time. Still further, the size and shape of the flights 170 can be altered to meet the needs of the material processed and create a more or less pronounced showering effect, thereby impacting the residence time in the drum 112.

In some embodiments, the flights 170 may be secured to the drum 112 in a particular density and arrangement to optimize or tailor characteristics of the resultant torrefied particles, the circulating gas stream, or both. The length of the reactor drum 112 may also be varied in initial design to create more or less residence time of the particles, the circulating gas stream, or both. In addition, particle loading conditions can be varied to create more or less resistance to the gas stream within the reactor drum 112, thus affecting residence time.

For example, in some embodiments, a relatively greater volumetric flow rate of particles may be set to crowd the interior of the drum 112 and slow the progression of the particles through the reactor drum 112. Conversely, a relatively smaller volumetric flow rate of biomass particles may be set to reduce crowding in the interior of the reactor drum 112 and speed the progression of biomass particles through the reactor drum 112.

The oxygen level inside the drum 112 may likewise be controlled by various design and process factors. For example, the mechanical design of the particle inlet may be selected to include, for example, an airlock, a gas-purged double airlock, screw mechanisms or the like, with each mechanism having a different level of ability to prevent the infiltration of oxygen. Preferably, the amount of oxygen that enters the system 110 with the particles is minimized, but is likely to vary with design according to particle size and/or desired production rate of the processed biomass. In addition, the incoming moisture content of the particles can be varied to control oxygen level.

During processing, the resulting evaporated water partially displaces oxygen within the system 110, and thus the level of moisture can be varied to suit production requirements (e.g., less initial moisture means less energy required to torrefy the particles, and more initial moisture results in less oxygen in the system). Still further, it is recognized that there is a net addition of gas to the system as volatiles and moisture are evaporated from the particles. As previously described, this excess gas may be exhausted from the system 110 via a stack 150 and may, according to some embodiments, be recaptured for use elsewhere in the process or another process, such as, for example, use as fuel to generate heat. The stack 150 can include a variable position damper 152 which may be used to balance the pressure inside the reactor drum 112 from slightly negative to slightly positive. Depending on the setting of the damper 152, this can be used to inhibit oxygen from entering the system 110.

In some embodiments, the moisture levels may be precisely controlled within the system 110 to modify the compounds contained in the gas stream via the established principals of water gas shift/reverse water gas shift reactions (e.g., water combines with carbon monoxide to produce hydrogen and carbon dioxide).

In some embodiments, many of the various operational parameters discussed above as well as other operational parameters may be adjusted (manually or automatically) during operation. In other embodiments, operational parameters may be established prior to operation. Irrespective of the particular control scheme, the ability to independently control various operational parameters of the systems described herein provide for particularly versatile systems and methods that are adaptable to changing conditions, such as, for example, the moisture content of the particles selected to be processed and a desired energy density of resultant torrefied particles which may vary.

The system 110 may also be outfitted with precision seals 166 at rotating to static connections and other low leakage connections and components to provide a particularly well sealed vessel to maintain consistent low levels of oxygen within the system 110.

Various safety devices may also be incorporated into the torrefaction, gasification, and/or pyrolysis systems to enhance operational safety. For instance, the systems may be equipped with vents that will rupture or open should a minor explosion or deflagration occur of sufficient magnitude to potentially cause equipment damage. As another example, spark detection and extinguishment systems may also be integrated into the torrefaction, gasification, and/or pyrolysis systems, such as, for example, spark detection and extinguishment systems and components marketed by GreCon, Inc. headquartered in Tigard, Oregon. In addition, system operational characteristics may be monitored, for example, by various sensors (e.g., temperature, pressure, oxygen, etc.), and the obtained operational data may be used to adjust and control the system as needed to enhance safety or to optimize the torrefaction, gasification, and/or pyrolysis process. In some embodiments, real time mass spectroscopy may also be used to identify compounds in the gas streams and to adjust or control the system as needed to enhance safety or to optimize the torrefaction, gasification, and/or pyrolysis process.

Overall, by knowing the processes by which heat, water, residence time and oxygen levels are controlled and by having the flexibility through initial design and the numerous process variables described herein, embodiments of the systems and methods may be set up to accommodate a variety of feed stocks in a variety of local conditions and provide the flexibility and control needed to achieve consistent torrefaction, gasification, and/or pyrolysis results. In some embodiments, for example, the systems and methods may be configured to torrefy biomass particles in the form of wood chips at a minimum rate of one ton of torrefied biomass particles per hour with the resultant torrefied biomass particles having an energy density of at least 20 GJ/ton. In some embodiments, the system and methods may torrefy, gasify, and/or pyrolyze particles while also refining heavy hydrocarbons that are boiled off of the particles into light hydrocarbons that are then extractable from the system.

The systems and methods described herein are particularly well suited to provide a continuous process that has many benefits over conventional systems, and in particular, batch systems and methods which require batch processing of biomass particles in a furnace, kiln or other similar device. The continuous nature of the systems and methods described herein enable, among other things, relatively higher production rates. In addition, the efficiency with which biomass particles may be processed with the systems and methods enable high material throughput at relatively lower energy demands.

Although embodiments of the systems and methods described herein are illustrated in the figures as including reactor drums which rotate about a horizontally aligned axis of rotation, it is appreciated that in some embodiments, the axis of rotation may be inclined. In such embodiments, gravity may play a significant role in transporting the biomass particles through the reactor drum. In addition, although embodiments of the systems and methods are described herein as involving a heated gas stream passing through the reactor drum to carry or transport the biomass particles while simultaneously transferring heat to the biomass particles to torrefy them, it is appreciated that in some embodiments the biomass particles may be transported by alternate mechanisms (e.g., gravity, screw devices, conveyor devices, etc.) and subjected to a counter-flowing heated gas stream within the reactor drum to torrefy the biomass particles.

Moreover, the various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system comprising:
a reactor drum;
a heat source that heats gas contained within the system to a temperature sufficient to torrefy particles within the reactor drum;
a device that moves the heated gas thereby forming a heated gas stream that passes through the reactor drum;
a duct system communicatively coupled to the heat source and the reactor drum thereby forming a recirculation loop that allows the heated gas to make multiple passes through the reactor drum; and
a region that promotes separation of a first hydrocarbon compound contained within the heated gas stream from a remainder of the heated gas stream, the remainder of the heated gas stream including a second hydrocarbon compound that is heavier than the first hydrocarbon compound.

2. The system of claim 1, further comprising:
an inlet communicatively coupled to the reactor drum such that particles received by the inlet subsequently enter the reactor drum.

3. The system of claim 2 wherein the heat source heats the gas contained within the system to a temperature sufficient to release the second hydrocarbon compound from the particles in a gaseous phase.

4. The system of claim 3 wherein the heat source heats the gas to a temperature of between about 220° F. and about 1,250° F. as measured when the heated gas stream is within the reactor drum.

5. The system of claim 3 wherein the released second hydrocarbon compound travels along the recirculation loop making multiple passes through the reactor drum.

6. The system of claim 1, further comprising at least one component that promotes separation of the first hydrocarbon from the remainder of the heated gas stream.

7. The system of claim 6 wherein the at least one component changes a temperature, a pressure, or both, of the heated gas stream as the heated gas stream passes through the region.

8. The system of claim 7 wherein the component lowers the temperature of the heated gas stream below a dew point of the first hydrocarbon, thereby causing the first hydrocarbon to transition from a gas phase to a liquid phase.

9. The system of claim 8, further comprising an outlet that evacuates the first hydrocarbon in the liquid phase from the recirculation loop.

10. The system of claim 9 wherein the outlet includes an airlock that at least limits entry of oxygen into the recirculation loop while evacuating the first hydrocarbon from the recirculation loop.

* * * * *